United States Patent [19]
Black

[11] Patent Number: 6,142,405
[45] Date of Patent: Nov. 7, 2000

[54] EXTENSION CORD STORAGE AND DISPENSING SYSTEM

[75] Inventor: Charles D. Black, Williston, N. Dak.

[73] Assignee: Stringliner Company, Williston, N. Dak.

[21] Appl. No.: 09/234,926

[22] Filed: Jan. 21, 1999

[51] Int. Cl.⁷ .................................................. B65H 39/00
[52] U.S. Cl. .................. 242/388.6; 242/402; 242/405.1; 242/405.2; 242/406
[58] Field of Search ................................ 242/388.6, 402, 242/405.1, 405.2, 406, 401, 613.3

[56] References Cited

U.S. PATENT DOCUMENTS

| | | | |
|---|---|---|---|
| 1,901,050 | 3/1933 | Voorhees | 242/405.2 |
| 3,529,786 | 9/1970 | Holden | 242/388.6 X |
| 3,576,297 | 4/1971 | Cowart, Jr. | 242/405.2 |
| 3,626,495 | 12/1971 | Bastian, Jr. | 242/405.2 |
| 3,901,458 | 8/1975 | Kuncz, Jr. | 242/405.2 |
| 3,926,383 | 12/1975 | McConnell | 242/405.1 |
| 4,123,012 | 10/1978 | Hough | 242/405.2 |
| 4,177,961 | 12/1979 | Gruenewald | 242/405.2 |
| 4,193,563 | 3/1980 | Vitale | 242/405.2 |
| 4,261,529 | 4/1981 | Sandberg et al. | 242/405.2 |
| 4,653,833 | 3/1987 | Czubernat et al. | 242/406 X |
| 4,778,125 | 10/1988 | Hu | 242/405.2 |
| 4,796,827 | 1/1989 | Munt, III et al. | 242/388.6 |
| 5,064,067 | 11/1991 | McAllister et al. | 242/613.3 X |
| 5,139,208 | 8/1992 | Schooley | 242/405.2 |
| 5,458,241 | 10/1995 | Brown | 242/405.2 X |

FOREIGN PATENT DOCUMENTS

| | | | |
|---|---|---|---|
| 6-144714 | 5/1994 | Japan | 242/388.6 |

*Primary Examiner*—Donald P. Walsh
*Assistant Examiner*—Minh-Chau Pham
*Attorney, Agent, or Firm*—Michael S. Neustel

[57] ABSTRACT

An extension cord storage and dispensing system for conveniently storing and dispensing an elongated extension cord of various lengths without entanglement and without requiring the unwrapping of the entire length of extension cord to effectively utilize both ends. The inventive device includes a second spool, a first spool and a handle. The second spool and the first spool preferably have a flat profile for convenient storage. The first spool receives a longer length of the extension cord while the second spool receives a shorter length of the extension cord that is commonly needed thereby separating the shorter length of the extension cord constantly dispensed and stored from the longer length. The first spool comprises a support base, and a vertical frame having a pair of opposing side members receiving the longer portion of the extension cord or other elongated object. The second spool comprises a first arm and a second arm. The first arm includes a first cutout and the second arm includes a second cutout for receiving a shorter length of the extension cord that is commonly dispensed. The first arm and the second arm include a first upper slot and a second upper slot respectively for removably receiving an end of the extension cord. A pair of support legs extending from the support base include a pair of lower slots for retaining an opposing distal end of the extension cord during nonuse. A support stand is removably attached to the pair of the support legs for allowing the frame to be vertically supported.

20 Claims, 7 Drawing Sheets

EXTENSION CORD STORAGE AND DISPENSING SYSTEM

BACKGROUND OF THE INVENTION

1. Field of the Invention

The present invention relates generally to extension cords and more specifically it relates to an extension cord storage and dispensing system for conveniently storing and dispensing various lengths of an extension cord without entanglement and without requiring the unwrapping of the entire length of extension cord to effectively utilize both ends.

Extension cords vary in length from 6 feet to over 100 feet. Extension cords are utilized to provide electrical power to locations not reachable by an electrical device's power cord. Consumers typically purchase shorter extension cords, such as 25 feet in length, to accommodate a majority of their electrical power needs. Consumers generally purchase long extension cords, such as 100 feet in length, to provide electrical power to locations far away from a conventional electrical outlet.

Hence, most consumers have both short and long extension cords to accommodate their needs. One common problem with long extension cords is that they become entangled and are difficult to store. Another problem is that long extension cords are not desirable to use in short spans such as 10–15 feet because of the amount of excess cord laying about the work site which can be extremely dangerous. Another problem is that many conventional outlets are at least four feet above the ground, hence requiring the complete unwrapping of the extension cord to allow the male end to be electrically coupled to the conventional outlet. Also, purchasing a plurality of extension cords of various lengths can be relatively expensive for the consumer. Hence, there is a need for a storage and dispensing device that will allow a user to utilize a single long extension cord both in remote and near locations that allows effective utilization of both ends of an extension cord while still allowing a central portion to remain wrapped upon the storage device.

2. Description of the Prior Art

Extension cords have been in use for years. Typically, the consumer will purchase both short and long extension cords to accommodate all of their needs. These extension cords are generally stored upon a bracket attached to a wall, wrapped upon a holder or simply laid upon a floor. These methods of storage result in the extension cords becoming entangled with one another making it difficult to utilize the extension cords without the burden of untangling them.

With conventional holders, the extension cord is merely wrapped about a post with one end of the extension cord surrounded by the remaining length of the extension cord. To effectively utilize both ends of the extension cord, the entire extension cord must be unwrapped regardless of the length of extension cord required. Hence, there is a need for an extension cord storage and dispensing device that will eliminate the need for various lengths of extension cords and that will allow the user to unwrap both opposing ends of the extension cord without having to unwrap the entire length of extension cord.

Examples of attempted extension cord storage and dispensing devices include U.S. Pat. No. 4,061,290 to Harrill; U.S. Pat. No. 4,244,536 to Harrill; U.S. Pat. No. 4,466,581 to Hill; and U.S. Pat. No. 3,837,448 to Hagstrom are all illustrative of such prior art.

Harrill (U.S. Pat. No. 4,061,290) discloses an extension cord reel and case. Harrill teaches a hollow cylindrical body open at one end, a stub shaft, and a wire spool having a fixed inner end flange rotatably journaled on the stub shaft.

Hill (U.S. Pat. No. 4,466,581) discloses a cable holder. Hill teaches a casing, a pair of annular housing elements mounted for rotation relative to the casing, and wherein each of the annular housing elements have central hub portions which abut and are locked together for joint rotation.

Hagstrom (U.S. Pat. No. 3,837,448) discloses a line cord caddy. Hagstrom teaches a spool having an extension cord wound upon and being encased within a stand-up type cover having a handgrip extending therefrom.

While these devices may be suitable for the particular purpose to which they address, none of them are suitable for conveniently storing and dispensing an elongated extension cord of various lengths without entanglement and without having to unwrap the entire length of extension cord to effectively utilize both ends of the extension cord. Conventional methods of storage and dispensing of long extension cords become entangled within the many feet of the extension cord, and do not allow effective utilization of both ends of the extension cord while still wrapped upon the storage device. Hence, there is a need for a storage and dispensing device that allows simultaneous dispensing lengths of both ends of the extension cord while a portion of the extension cord is retained orderly wrapped on the storage device.

In these respects, the extension cord storage and dispensing system according to the present invention substantially departs from the conventional concepts and designs of the prior art, and in so doing provides an apparatus primarily developed for the purpose of conveniently storing, dispensing and utilizing both opposing ends of an elongated extension cord while retaining the unrequired portion of the extension cord upon the storage device.

SUMMARY OF THE INVENTION

In view of the foregoing disadvantages inherent in the known types of extension cord holders now present in the prior art, the present invention provides a new extension cord storage and dispensing system construction wherein the same can be utilized for conveniently storing and dispensing an elongated extension cord of various lengths without entanglement and without requiring the unwrapping of the entire length of extension cord to effectively utilize both ends.

The general purpose of the present invention, which will be described subsequently in greater detail, is to provide a new extension cord storage and dispensing system that has many of the advantages of the extension cord holders mentioned heretofore and many novel features that result in a new extension cord storage and dispensing system which is not anticipated, rendered obvious, suggested, or even implied by any of the prior art extension cord holders, either alone or in any combination thereof.

To attain this, the present invention generally comprises a second spool, a first spool and a handle. The first spool receives a longer length of the extension cord while the second spool receives a shorter length of the extension cord that is commonly needed thereby separating the shorter length of the extension cord constantly dispensed and stored from the longer length. The first spool comprises a support base, and a vertical frame having a pair of opposing side members receiving the longer portion of the extension cord or other elongated object. The second spool comprises a first arm and a second arm. The first arm includes a first cutout and the second arm includes a second cutout for receiving a shorter length of the extension cord that is commonly dispensed. The first arm and the second arm include a first upper slot and a second upper slot respectively for removably receiving an end of the extension cord. A pair of support legs extending from the support base include a pair of lower slots for retaining an opposing distal end of the extension cord during nonuse. A support stand is removably attached to the pair of the support legs for allowing the frame to be vertically supported There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an extension cord storage and dispensing system that will overcome the shortcomings of the prior art devices.

Another object is to provide an extension cord storage and dispensing system that reduces entanglement of an extension cord during repeated dispensing, storage and utilization.

An additional object is to provide an extension cord storage and dispensing system that easily dispenses a shorter length of a relatively long extension cord without interference of the remaining length.

A further object is to provide an extension cord storage and dispensing system that eliminates the need to have a plurality of extension cords of various lengths.

An additional object is to provide an extension cord storage and dispensing system that stores an extension cord during nonuse.

Another object is to provide an extension cord storage and dispensing system that is capable of storing various lengths of extension cords.

A further object is to provide a storage system that is capable of storing and dispensing extension cords, light strings, rope and other lengthy items in an organized manner.

Another object is to provide an extension cord storage and dispensing system that allows a user to effectively utilize both ends of a conventional extension cord without having to unwrap the entire length of extension cord.

A further object is to provide an extension cord storage and dispensing system that allows the user to transport an extension cord between areas without entanglement.

A further object is to provide an extension cord storage and dispensing system that catchably secures the opposing ends of the extension cord to prevent unwrapping.

Another object is to provide an extension cord storage and dispensing system that maintains the extension cord off contaminated floors while being utilized or stored.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
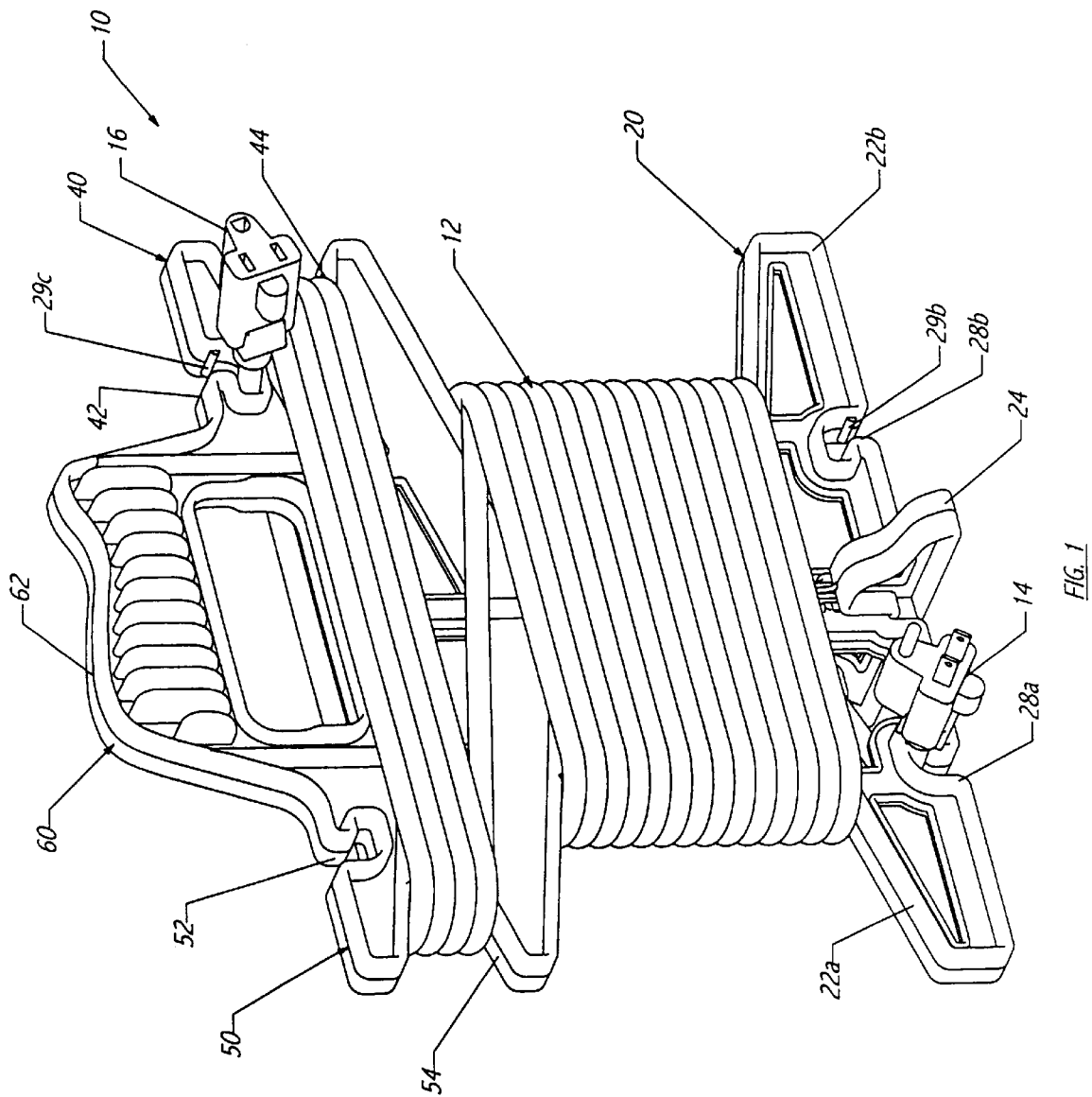
FIG. 1 is an upper perspective view of the present invention with a conventional extension cord wrapped thereabouts.

Turning now descriptively to the drawings, in which similar reference characters denote similar elements throughout the several view, FIGS. 1 through 7 illustrate an extension cord storage and dispensing system 10, which comprises a second spool, a first spool and a handle 60 preferably having a generally flat structure. However, it can be appreciated by one skilled in the art that the extension cord storage and dispensing system 10 may have any well known shape or design. The second spool preferably has a larger width than the first spool even though it can be appreciated that they can also be the same width. The first spool receives a longer length of the extension cord 12 while the second spool receives a shorter length of the extension cord 12 that is commonly needed thereby separating the shorter length of the extension cord 12 constantly dispensed and stored from the longer length. The first spool comprises a support base 20, and a vertical frame 30 having a pair of opposing side members 32a–b receiving the longer portion of the extension cord 12 or other elongated object. The second spool comprises a first arm 40 and a second arm 50. The first arm 40 includes a first cutout 44 and the second arm 50 includes a second cutout 54 for receiving a shorter length of the extension cord 12 that is commonly dispensed. The first arm 40 and the second arm 50 include a first upper slot 42 and a second upper slot 52 respectively for removably receiving an end of the extension cord 12. A pair of support legs 22a–b extending from the support base 20 include a pair of lower slots 28a–b for retaining an opposing distal end of the extension cord 12 during nonuse. A support stand 24 is removably attached to the pair of the support legs 22a–b for allowing the frame 30 to be vertically supported. It can be appreciated by one skilled in the art that the orientation of the first spool and the second spool can be her vertical or horizontal with respect to a ground surface. It can be appreciated by one skilled in the art that the extension cord storage and dispensing system 10 is capable of storing more than one extension cord simultaneously upon the spools.

Figure 3:
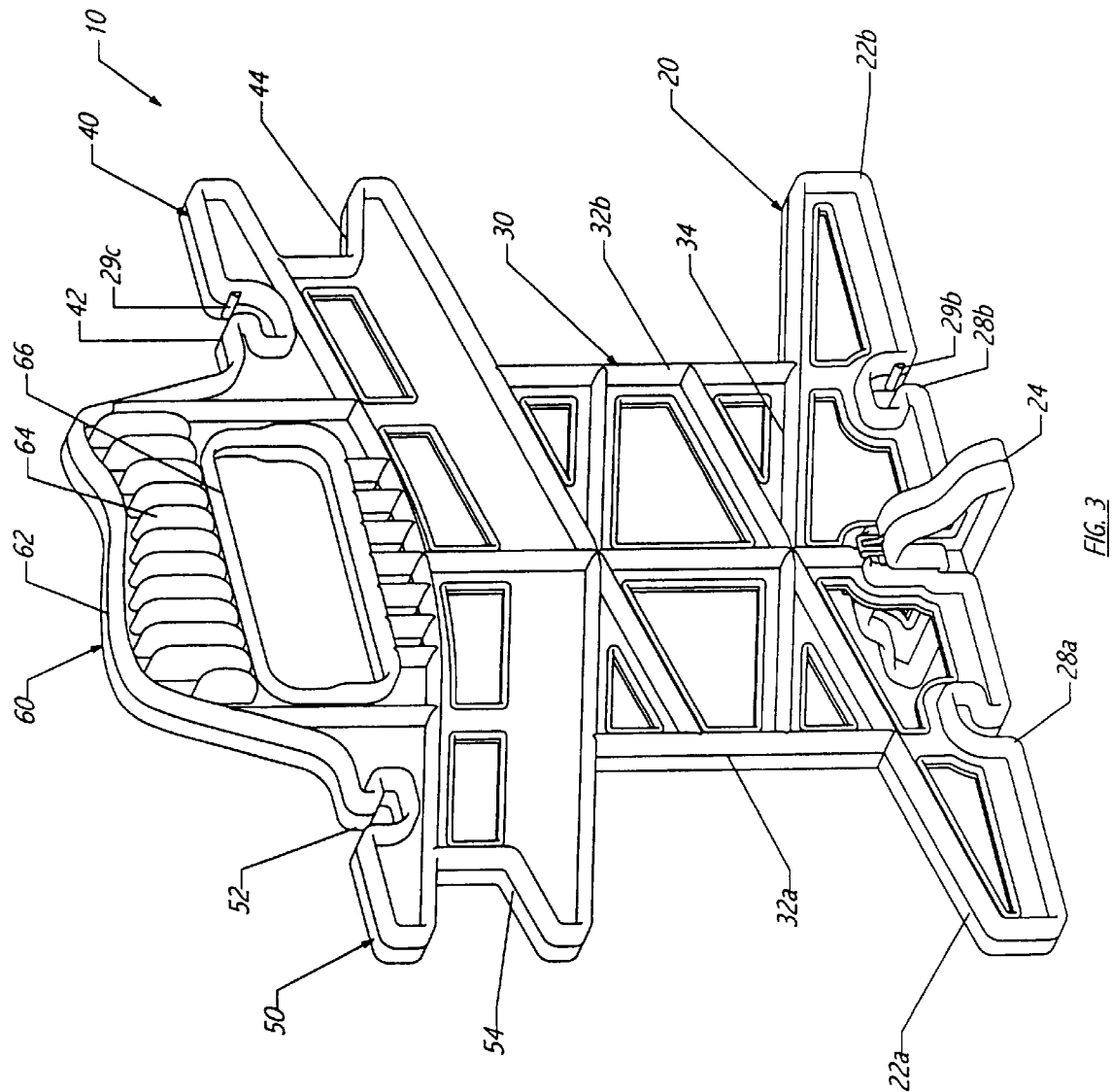
FIG. 3 is an upper perspective view of the present invention.
Figure 4:
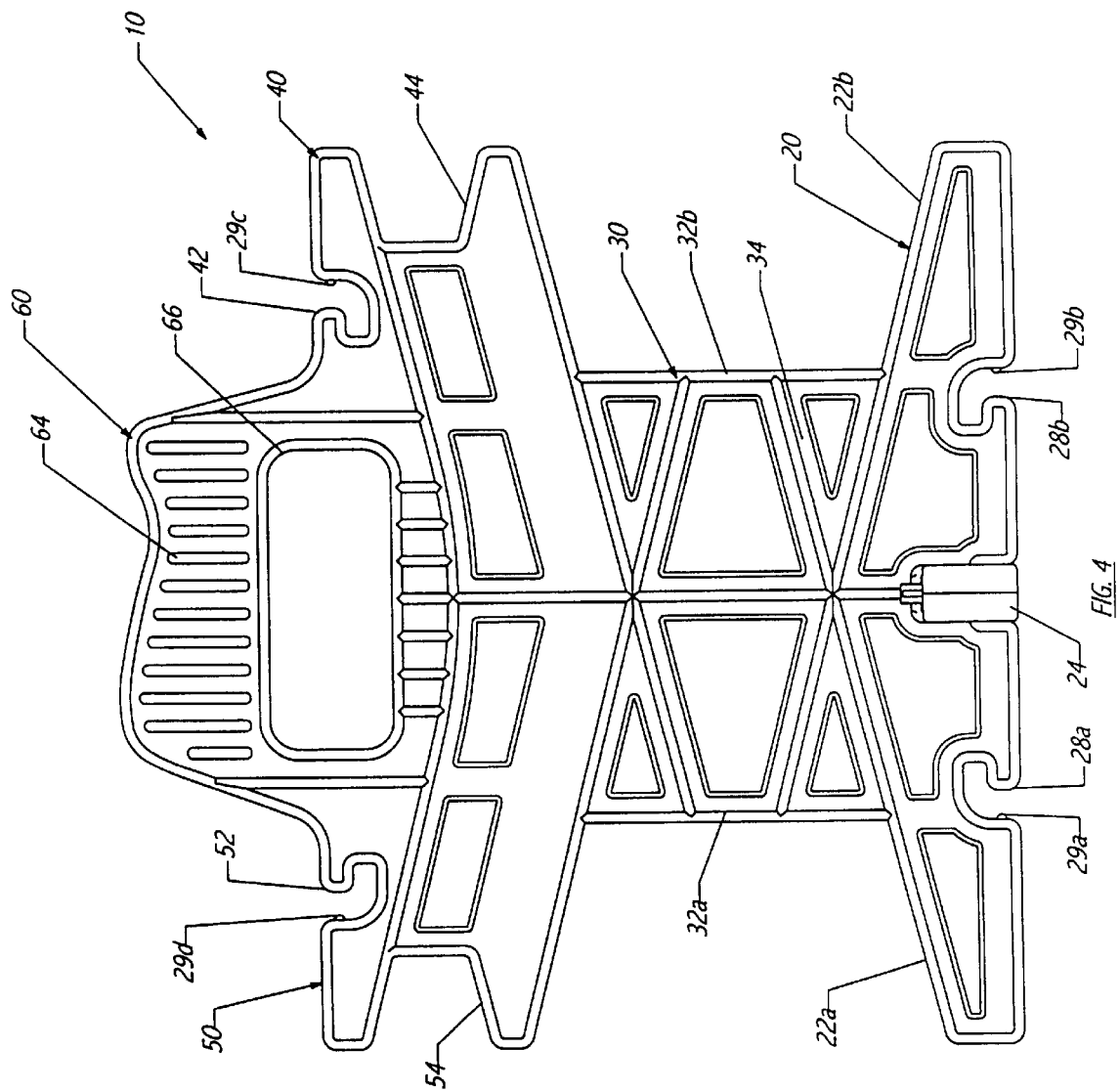
FIG. 4 is a side view of the present invention.
Figure 5:
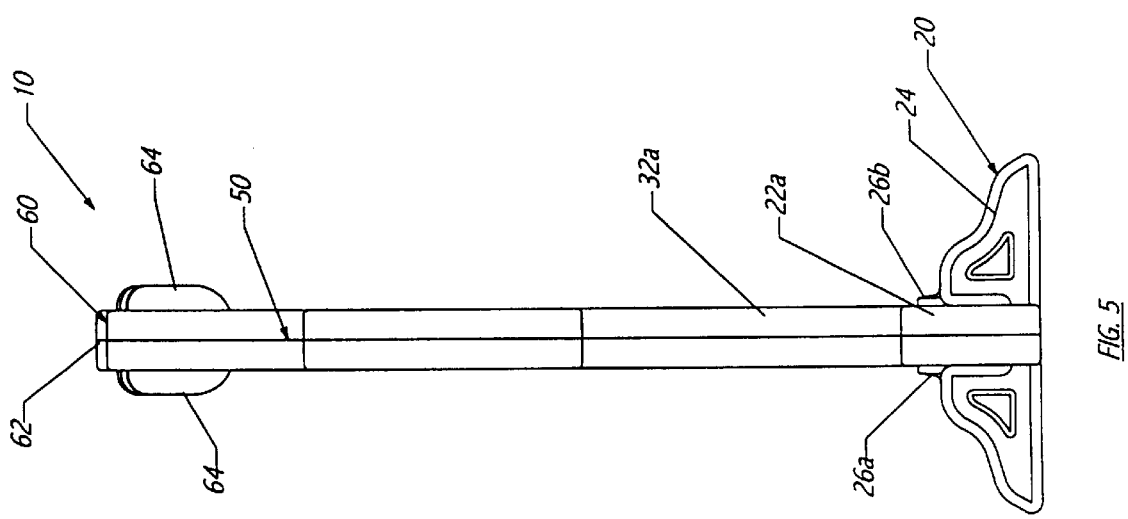
FIG. 5 is an end view of the present invention.
Figure 6:
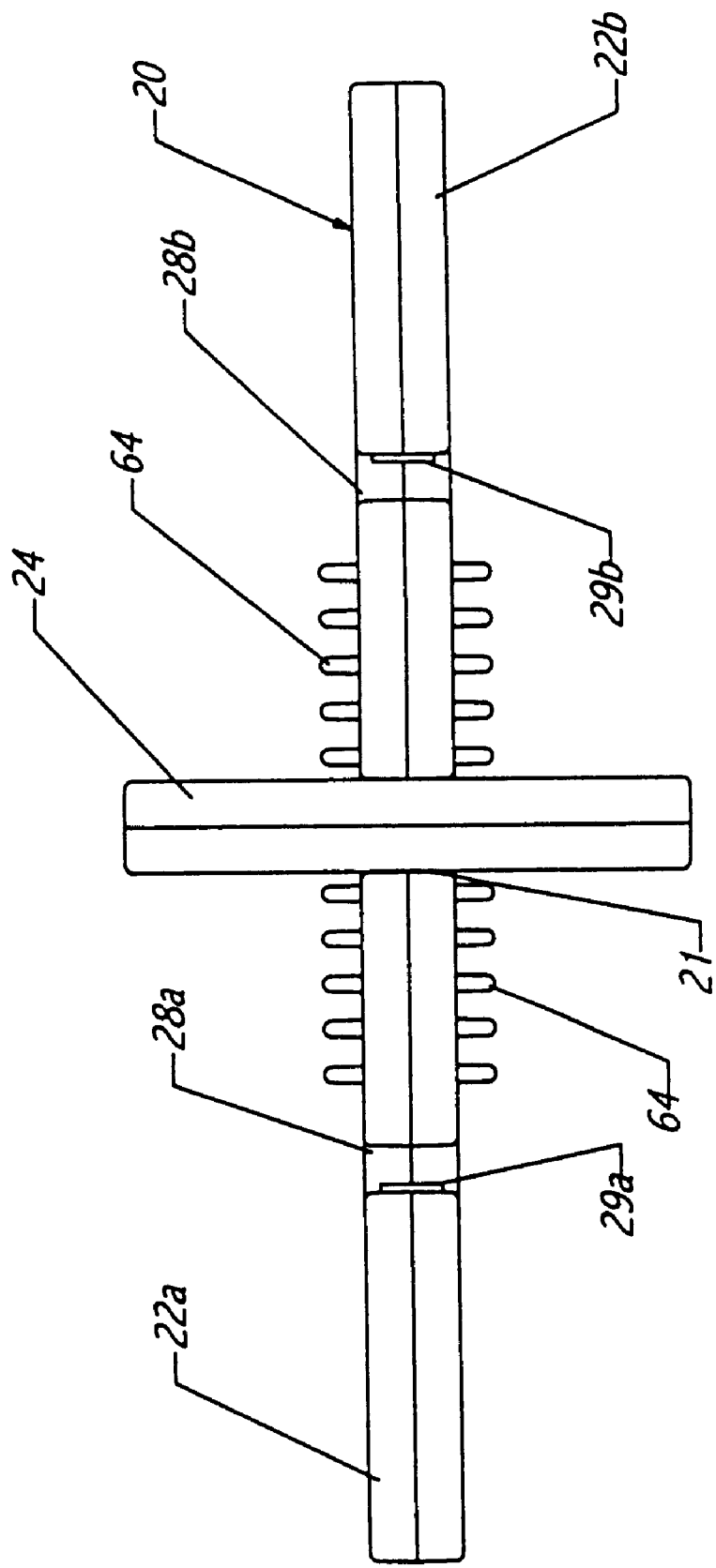
FIG. 6 is a bottom view of the present invention.

As shown in FIGS. 3 and 4, the first spool comprises a support base 20 and a frame 30. The support base 20 includes at least two support legs 22a–b extending away from one another. The support legs 22a–b preferably have a flat lower surface as shown in FIG. 4 of the drawings. The upper surface of the support legs 22a–b preferably slants downwardly away from the center for receiving the conventional extension cord 12.

As shown in FIGS. 1 through 4, at least two lower slots 28a–b extend into the flat lower surface of the support legs 22a–b respectively. The lower slots 28a–b preferably have an inverted L-shape as best shown in FIG. 4 of the drawings. The lower slots 28a–b are wide enough for receiving a conventional extension cord 12 as shown in FIG. 1 of the drawings.

A pair of retaining nubs 29a–b are attached to the inside walls of the lower slots 28a–b respectively near the opening 66 as best shown in FIG. 4 of the drawings. The retaining nubs 29a–b prevent the extension cord 12 from being accidentally removed from within the lower slots 28a–b during storage. As shown in FIG. 1, the male connector 14 or the female connector 16 prevent the extension cord 12 from being removed from the lower slots 28a–b along the longitudinal axis of the extension cord 12.

Figure 7:
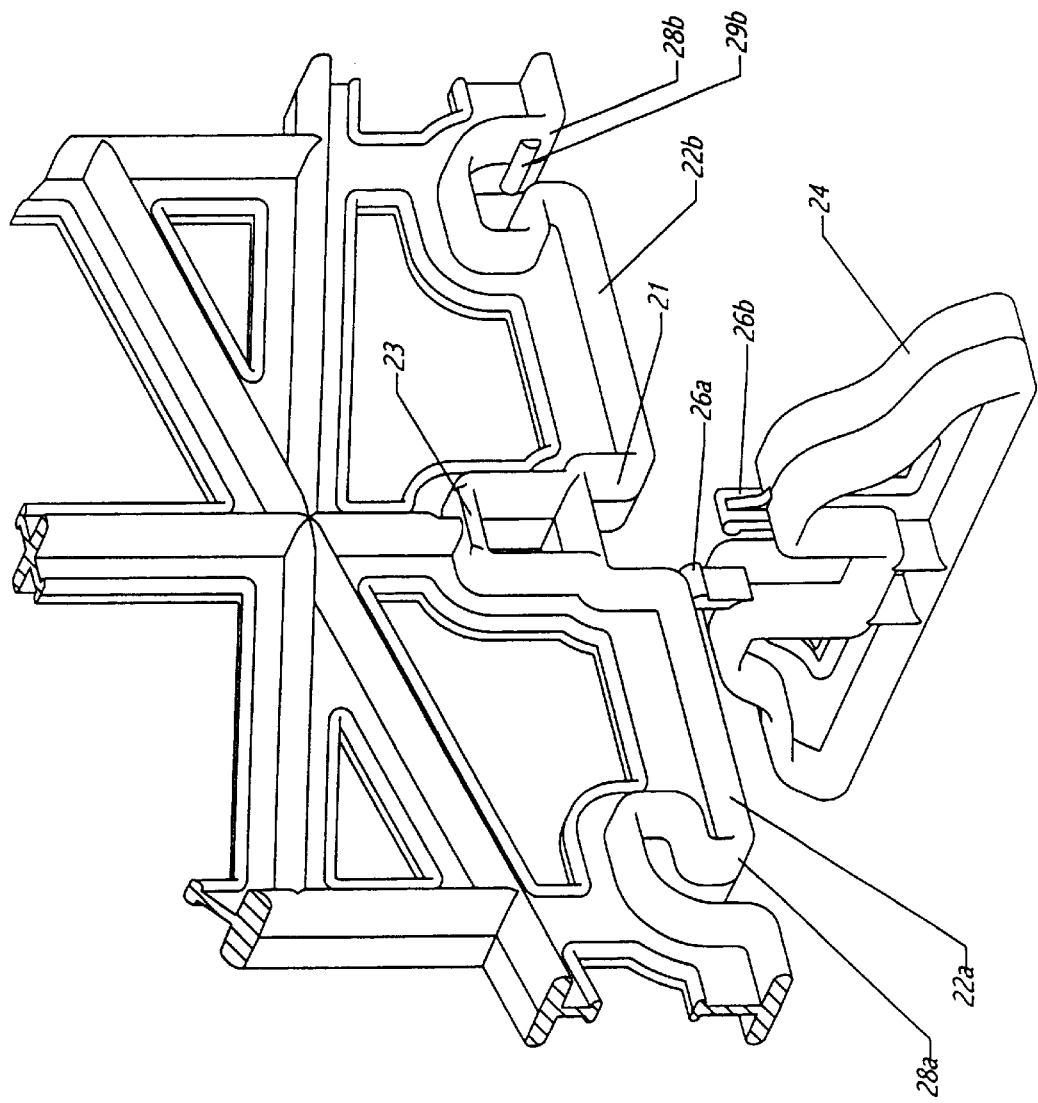
FIG. 7 is a magnified exploded upper perspective view of the removable support stand.

As shown in FIG. 7 of the drawings, a receiving slot 21 extends into a central edge of the support base 20. As also shown in FIG. 7, a pair of opposing lips 23 are positioned above the receiving slot 21 a finite distance. A support stand 24 is provided that has a pair of opposing clips 26a–b extending about a slot that corresponds with the receiving slot 21. The support stand 24 is removably attachable to the support base 20 traversely for providing side support to the support base 20. The clips 26a–b of the support stand 24 removably catch upon the pair of opposing lips 23 of the support base 20 thereby retaining the support stand 24 in position. The receiving slot 21 mates with the unnumbered slot within the support stand 24 to provide added stability.

As best shown in FIGS. 3 and 4, the frame 30 extends from the support base 20 orthogonal to the flat lower surface of the support legs 22a–b. The frame 30 generally includes a pair of opposing side members 32a–b with a plurality of cross members 34 extending between. The side members 32a–b are preferably straight, however it can be appreciated by one skilled in the art that the side members 32a–b may have any well-known shape such as a curvature. The extension cord 12 surrounds the frame 30 during storage as shown in FIGS. 1 and 2 of the drawings.

Figure 2:
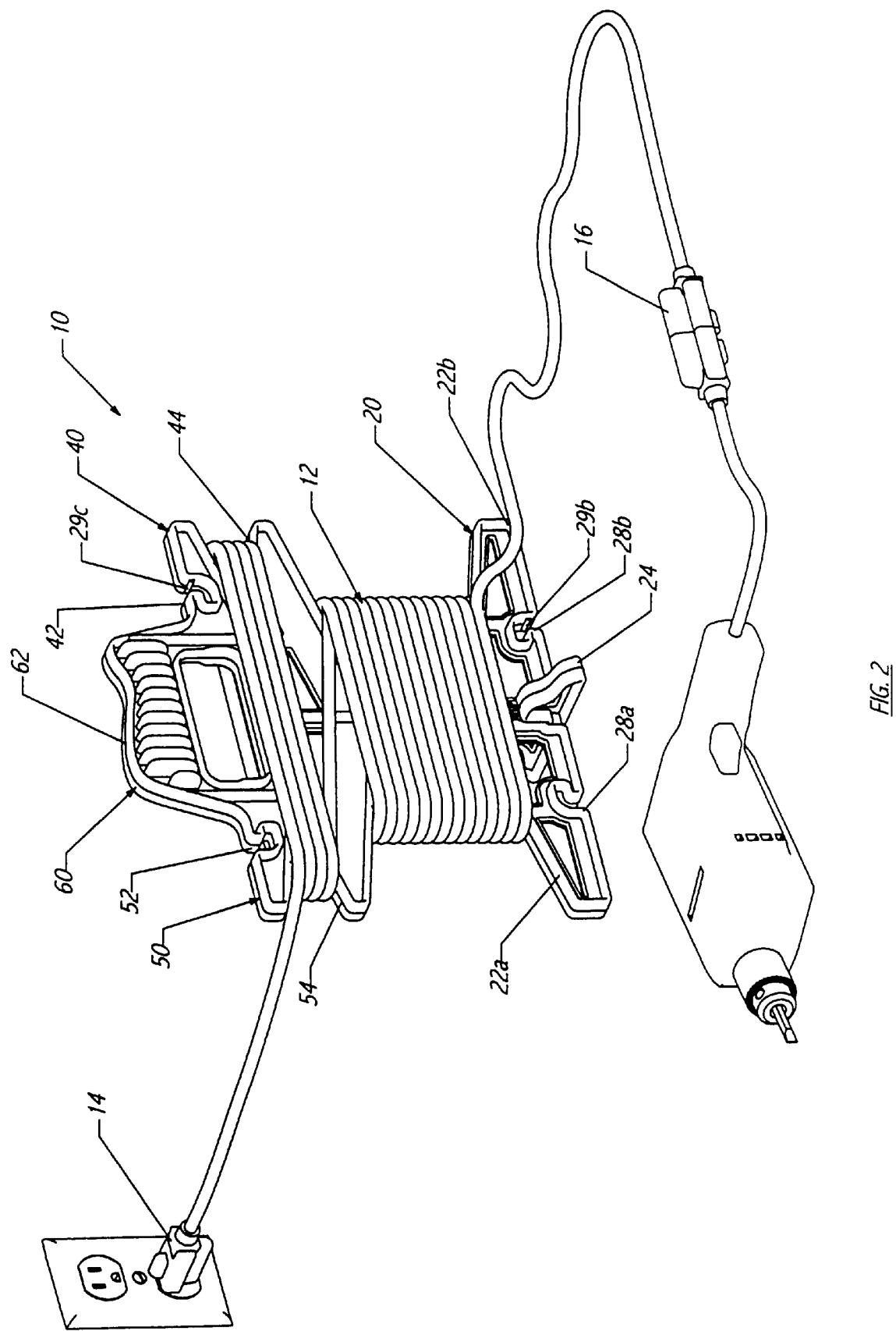
FIG. 2 is an upper perspective view of the present invention with the extension cord partially unwrapped during use.

As shown in FIGS. 1 through 4 of the drawings, the second spool comprises a first arm 40 and a second arm 50 both connected to the frame 30 and extending outwardly. The distal end of the first arm 40 includes a first cutout 44 as shown in FIG. 4. The distal end of the second arm 50 includes a second cutout 54 as shown in FIG. 4. The cutouts 44, 54 of the arms 40, 50 receive and retain the extension cord 12 during storage as shown in FIGS. 1 and 2 of the drawings.

The cutouts 44, 54 preferably have a U-shape, however any well-known shape may be utilized. The lower edges of the arms 40, 50 are preferably angled upwardly thereby forming generally U-shaped recessed areas between the support legs 22a–b and the side members 32a–b as shown in FIG. 4 of the drawings. The outwardly angled U-shaped recessed areas provide easy wrapping of the extension cord 12 about the first spool while reducing the chance of accidental unwinding.

The first arm 40 includes at least one first upper slot 42 as shown in FIG. 4. The second arm 50 includes at least one second upper slot 52 as shown in FIG. 4. The upper slots 42, 52 receive the opposing end of the extension cord 12 similar to the lower slots 28a–b within the support base 20. A pair of retaining nubs 29c–d are attached within the upper slots 42, 52 for capturing the extension cord 12 within the upper slots 42, 52. As with the lower slots 28a–b, the upper slots 42, 52 preferably have an L-shape for retaining the extension cord 12.

As best shown in FIGS. 3 and 4 of the drawings, a handle 60 is connected to the second spool for allowing the user to grasp with a single hand for transporting or winding/unwinding the extension cord 12. The handle 60 includes an ergonomic member 62 shaped to comfortably fit to the user's hand as shown in FIGS. 1 through 3. The ergonomic member 62 extends between the first arm 40 and the second arm 50 as shown in FIG. 4 of the drawings.

As shown in FIGS. 1 through 4, an opening 66 projects through the handle 60 allowing the user to insert their fingers through when grasping the ergonomic member 62. In addition, when the user is winding/unwinding the extension cord 12 from the first spool the user may insert their hand partially into the opening 66 so that the tips of their fingers will be engaging a central portion of the extension cord 12 storage and dispensing system 10 thereby reducing wrist strain. As shown in FIGS. 1 through 6, a plurality of rib members 64 extend orthogonally from the handle 60 for providing increased gripping and comfort to the user during use.

When first using the present invention, the user selects a location along the extension cord 12, preferably 10–25 feet in from one of the connectors 14, 16. The user then begins wrapping the extension cord 12 from the selected location about the second spool until one of the connectors 14, 16 are near the second spool. The user then positions the male connector 14 or the female connector 16 near the second spool within one of the upper slots 42, 52 to retain the extension cord 12 in the storage position. The user then wraps the remaining extension cord 12, approximately 50–100 feet, from the selected location about the first spool. The user positions either the male connector 14 or the female connector 16 of the conventional extension cord 12 within one of the lower slots 28a–b to retain the extension cord 12 in the storage position. The retaining nubs 29a–b retain the extension cord 12 within the lower slots 28a–b as shown in FIG. 1 of the drawings. The user may then grasp the handle 60 to transport the extension cord 12 to a storage area or to a work site. If the user only requires the use of a short extension cord 12, the user removes the connector 14, 16 from one of the lower slots 28a–b and unwraps the required length of extension cord 12 from the first spool. The user then couples the connector 14, 16 to the electrical device such as a drill shown in FIG. 2 of the drawings. The user then removes the connector 14, 16 from one of the upper slots 42, 52 and unwraps the required length of extension cord 12 from the second spool. The user then couples the connector 14, 16 to the electrical outlet shown in FIG. 2 thereby providing electrical power to the electrical device without having to unwind the entire extension cord 12. The support stand 20 supports the first spool and the second spool in an upright position so as to prevent the extension cord 12 from becoming contaminated by the ground surface. When finished, the above process is simply reversed. It can be appreciated by one skilled in the art that the invention is not limited to the above procedure for utilizing the present invention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storage and dispensing system for storing and dispensing an elongated object, comprising:
    a first spool; and
    a second spool immovably attached to said first spool, wherein said first spool and said second spool store and dispense an elongated object;
    wherein said second spool has a width greater than a width of said first spool; and
    wherein said second spool has a height smaller than a height of said first spool.

2. The storage and dispensing system of claim 1, including a handle attached to said second spool.

3. The storage and dispensing system of claim 2, including an opening within said handle for receiving a user's hand.

4. The storage and dispensing system of claim 1, wherein said first spool includes a support base for supporting said first spool and said second spool in a substantially vertical position.

5. The storage and dispensing system of claim 4, wherein said support base comprises:
    a pair of support legs extending away from one another; and
    a support stand removably attachable to said pair of support legs.

6. The storage and dispensing system of claim 1, wherein said first spool includes at least one lower slot for catchably receiving a distal end of said elongated object.

7. The storage and dispensing system of claim 6, wherein said second spool includes at least one upper slot for catchably receiving an opposing distal end of said elongated object.

8. The storage and dispensing system of claim 7, wherein each of said at least one lower slot and said at least one upper slot include at least one retaining nub.

9. The storage and dispensing system of claim 1, wherein said first spool has an I-shape.

10. A storage and dispensing system, comprising:
    at least one immovable spool for storing and dispensing an elongated object;
    at least one partition member attached to said at least one immovable spool for separating said at least one immovable spool into at least two separated portions for storage of said elongated object; and
    wherein at least one of said at least two separated portions has a width greater than a width of adjacent separated portions, wherein said width is orthogonal with respect to an axis of said at least one immovable spool.

11. The storage and dispensing system of claim 10, wherein said at least one immovable spool includes a support base for supporting said at least one immovable spool in a substantially vertical position.

12. The storage and dispensing system of claim 11, wherein said support base comprises:
    a pair of support legs extending away from one another; and
    a support stand removably attachable to said pair of support legs.

13. The storage and dispensing system of claim 10, wherein said at least one immovable spool is I-shaped.

14. The storage and dispensing system of claim 10, wherein said at least one immovable spool includes at least one slot for catchably receiving a distal end of said elongated object.

15. The storage and dispensing system of claim 14, wherein said at least one slot include at least one retaining nub.

16. The storage and dispensing system of claim 10, including a handle.

17. A storage and dispensing system for storing and dispensing an elongated object, comprising:
    a first spool; and
    a second spool immovably attached to said first spool, wherein said first spool and said second spool store and dispense an elongated object;
    wherein said second spool has a width greater than a width of said first spool, wherein said width is orthogonal to a common axis of said first spool and said second spool.

18. The storage and dispensing system of claim 17, wherein said first spool includes a support base for supporting said first spool and said second spool in a substantially vertical position.

19. The storage and dispensing system of claim 18, wherein said support base comprises:
    a pair of support legs extending away from one another; and
    a support stand removably attachable to said pair of support legs.

20. The storage and dispensing system of claim 17, wherein said first spool includes at least one lower slot for catchably receiving a distal end of said elongated object.

* * * * *